Figure 1:
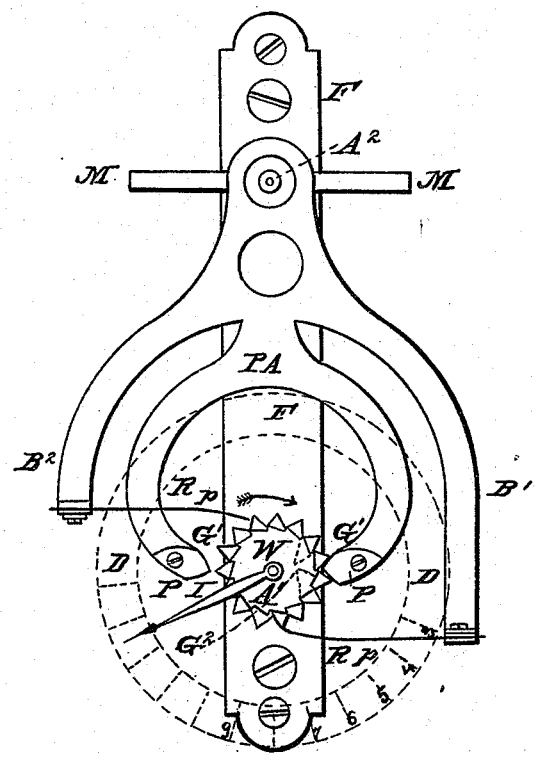
Figure 5:
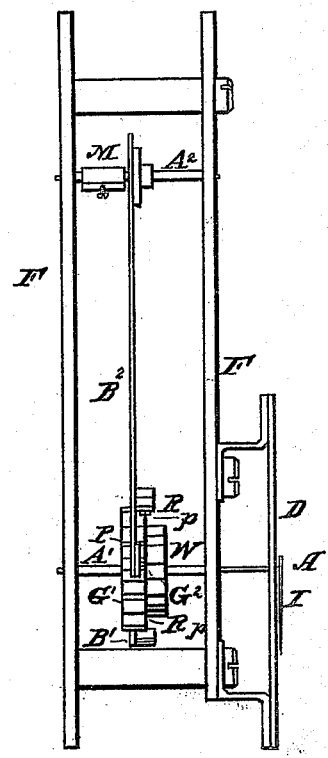
Figure 2:
Figure 3:
Figure 4:
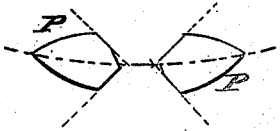

B. F. EDMANDS & J. HAMBLET, Jr.

Dial Telegraph.

No. 79,741. Patented July 7, 1868.

Witnesses:
John Sargent
Wm E Sargent

Inventors:
B F Edmunds
James Hamblet Jr

United States Patent Office.

BENJAMIN FRANKLIN EDMANDS, OF BOSTON, AND JAMES HAMBLET, JR. OF CHARLESTOWN, MASSACHUSETTS.

*Letters Patent No. 79,741, dated July 7, 1868.*

IMPROVEMENT IN ESCAPEMENTS FOR DIAL-TELEGRAPH INSTRUMENTS.

*The Schedule referred to in these Letters Patent and making part of the same.*

TO ALL WHOM IT MAY CONCERN:

Be it known that we, BENJAMIN FRANKLIN EDMANDS, of Boston, in the county of Suffolk, and State of Massachusetts, and JAMES HAMBLET, Jr., of Charlestown, in the county of Middlesex, and State aforesaid, have invented a new and useful Improvement in "Escapements for Dial-Indicators;" and we do hereby declare that the following is a full and exact description of the construction, operation, and use of the same, reference being had to the accompanying drawings, and to the letters and figures marked thereon.

Figure I is a front view.

Figures II and III represent the shape of the double-escape-wheel teeth.

Figure IV shows the shape of the rigid pallets.

Figure V, side view of the apparatus.

The instrument consists of a wheel, W, which has upon its periphery two rows of gearing or teeth, $G^1$ $G^2$; the first series of teeth being nearly of the shape usually found in dial-escape wheels. The teeth of the second series are of the ratchet-form. The two series constitute a double-geared escape-wheel. For convenience in cutting the teeth, it may be constructed of two wheels, as represented in Figs. II and III. Both are then placed upon the same arbor $A^1$, to which they are fastened, either apart or in contact with each other. This arbor carries at one end the index or pointer I, which passes over one division or space of the dial D at every vibration or impulse.

A double set of pallets, P P and R p R p, are attached to a pallet-anchor, P A, suspended from and moving with its arbor $A^2$, which carries also an attached lever or armature, M, to be vibrated by an electro-magnet or other motive-power.

The pallets P P are, as usual in clock or in dial-pallets, rigid, or at fixed mutual distance. Their action is upon the wheel-teeth $G^1$ of the usual form, and in the usual manner as detentives.

The pallets P P are peculiar in shape, each one having a detentive face, and also a propulsive face, of a curved shape, necessary, because of the mutual action of the rigid pallets P and the resilient pallets R p. This curved shape will vary according to the shape of the teeth of the escape-wheel; that is, if the teeth of the escape-wheel, of the same diameter that is represented in the figures, had been greater in number, their angles would be different, and consequently a different and corresponding shape of the rigid pallets P P would be necessary.

The number of subdivisions on the dial-plate D is twice that of the number of teeth $G^1$ on the wheel W.

The pallets R p R p are resilient in action upon or in contact with the other row of teeth $G^2$, made in the common ratchet-shape. The combination of the anchor-pallets P and pawl-pallets R p with the double-geared escape-wheel W and with the armature M, is such that, on application of any motive-power to the armature or lever M, which will effect vibratory motions, the double wheel W will rotate over the dial-plate D in the direction indicated by the arrow, and carry the index I over the dial-plate D.

The design and action are to initiate at each vibration the motion of the escape-wheel W, by the impact and action of one of the resilient pallets R p, and to continue and finish it by the operation of one of the fixed anchor-pallets P.

Fig. I shows the working parts in a state of rest just after the completion of a vibration to the left, and with the anchor-pallet P on the right, in a position detentive to the tooth $G^1$ above it, while the resilient pallet R p, attached to the anchor-branch $B^1$, is resting its other extremity upon one of the ratchet-formed teeth $G^2$ below, and at or near the angle formed by two of said teeth.

The pallet P on the left has been moved out from between two of the teeth of the escape-wheel, and stands at a little distance from it; its point being nearly opposite and (measuring on the arc of vibration) a shade below the apex of one of the teeth $G^1$, while the resilient pallet, carried on branch $B^2$, has its extremity resting on one of the ratchet-formed teeth $G^2$ above, and at or near the angle of two of said teeth.

The next vibration toward the right will invert, side for side, the positions of the pallets as follows: At the movement of the pallets P P, the escape-wheel is left free from their influence, and subject only to that of the resilient pallets R $p$ R $p$, and consequently may be easily moved. The resilient pallet R $p$ on the left, then coming in contact with the radial face of the teeth $G^2$ in front of it, commences to move the escape-wheel W and the index I, and, by such movement, has effect to prevent tripping; this movement being analogous to that of a clock-train or "maintaining power," by placing the interstice between two of the teeth $G^1$ in position for the sure entrance of the left pallet P between them.

Thus far the only resistance to motion which has been encountered by the propelling-pallet, or by the motive-power, is the inertia of the moving-wheel W and the index, together with slight resistance of the other resilient pallet R $p$ on the opposite side, caused by its light friction upon the passing tooth until it springs to the next tooth.

The pallet P enters between the two teeth $G^1$ opposite to it, and immediately, but slightly after the starting of the wheel, brings the propulsive face of the pallet against the upper of these two teeth $G^1$, and completes the propulsion of the escape-wheel upon being forced by the motive-power entirely in, thus relieving the delicate resilient pallet R $p$ from all further strain, and from the shock which, were it not for this provision, would occur when the detentive face of the pallet P and the tooth $G^1$ below it come in contact.

The points gained by these arrangements, as above described, are, that not only is this form of escapement reliable and efficient for dial-indicators generally, but that it is especially adapted as an indicator for magneto-electric or for electro-magnetic telegraph-systems, because the mutual actions between the delicate resilient pallets and the escape-wheel free to move with the slightest impulse, take place at times when the armature M is at its furthest distances from the attracting-magnet, and consequently when the motive-power is at or near its minimum, and that the frictional and detentive actions of the rigid pallets P come into operation only after movement has been started and momentum gained. It will be observed also that this takes place at a moment when the armature is already in motion toward its attracting-magnet, and is gaining power in proportion to the lessening distance. It is also an especial advantage that this arrangement dispenses with all forms of independent and frictional detent.

In especial cases, where an electric current of small power only is to be constantly used, the instrument may be made without the propulsive faces of the pallets P, leaving the propulsion of the wheel W entirely to the resilient pallets R $p$.

The details of one vibration from left to right have been above described. The application of a "to-and-fro" power or movement to the armature or lever M, or in any equivalent manner, effecting alternate vibrations, will cause a revolution of the wheel W, which carries the index I over and around the dial D.

The dial-plate is to be marked with letters, figures, or words, as each purpose for which the instrument is used may demand.

In the foregoing specification of the apparatus, the double anchor P A $B^1$ $B^2$, with its attached armature M, is described as being in motion, and we consider this as the most desirable mode of propelling the index, I; but it is obvious that the double anchor may be fixed, and the armature M attached to the frame F, in which case the vibration of the frame F, or its equivalent in the form of a rod, lever, or arm, will impel the wheel W, and its affixed index will traverse the dial-plate in the same manner as hereinbefore described.

What we claim, and desire to secure by Letters Patent, is—

An escapement, consisting of an escape-wheel, having two rows or series of teeth, as described, and an arbor, which carries also an index, impelled by a double set of pallets, one set being rigid, and the other set resilient, or their equivalents, substantially as described.

We also claim the double pallet-anchor, or its equivalent, with its suspension-arbor, its attached pallets, and armature or lever, as described.

We also claim the combination of the anchor-pallets and pawl-pallets, with the double escape-wheel, as described.

We also claim the combination of an escapement, constructed as herein described, with a magneto-electric machine, or an electro-magnetic apparatus, or other motor having the effect of causing a vibratory motion of the armature or lever M, substantially as herein set forth.

B. F. EDMANDS. [L. S.]
JAMES HAMBLET, JR. [L. S.]

Witnesses:
 HARRISON WHITTEMORE,
 J. B. JOHNSON.